W. F. SECHRIST.
SCISSORS.
APPLICATION FILED JULY 9, 1915.
1,198,484.
Patented Sept. 19, 1916.
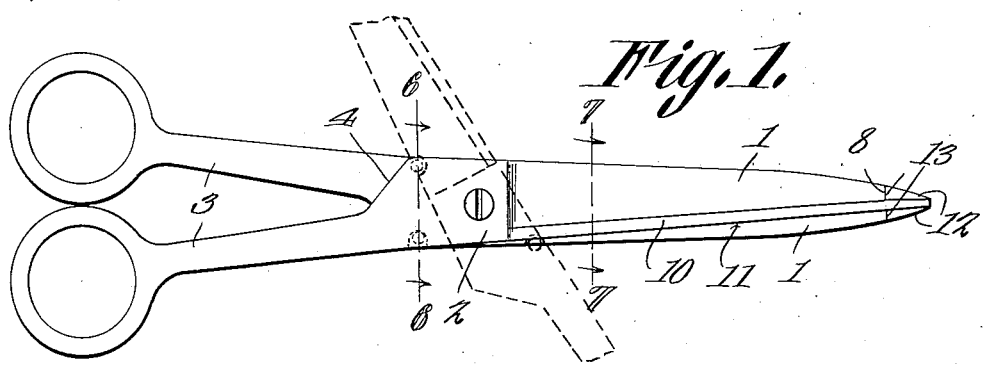
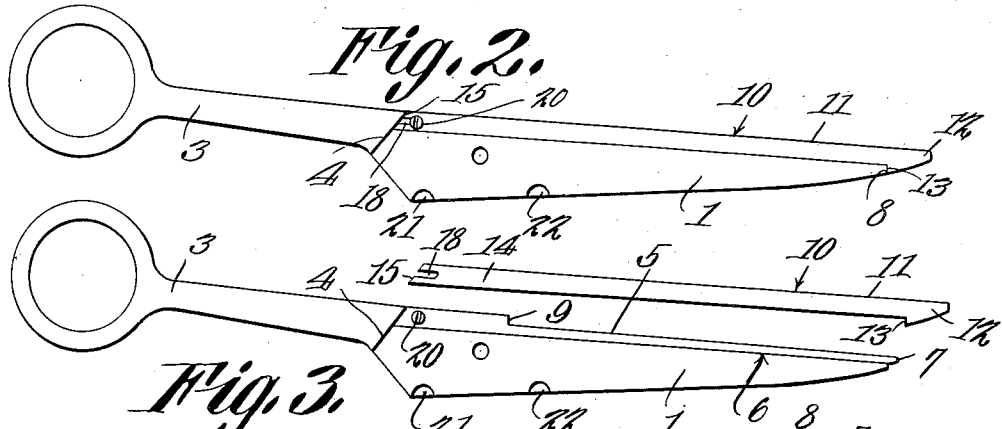
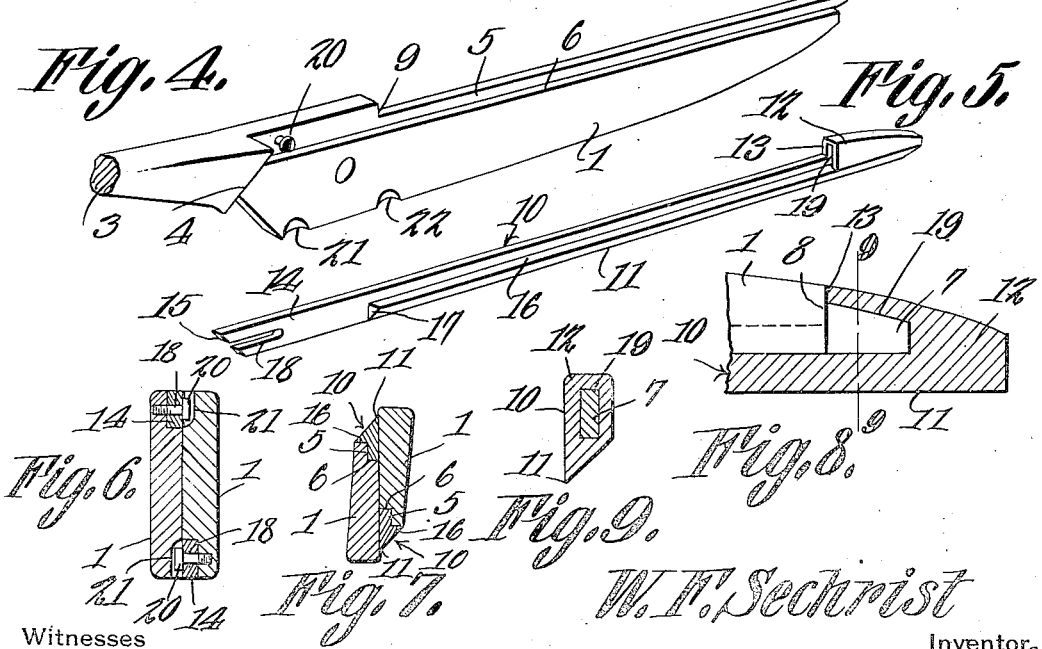
Witnesses
W. F. Sechrist
Inventor,
by
Attorneys.

UNITED STATES PATENT OFFICE.

WILLIAM F. SECHRIST, OF LANCASTER, PENNSYLVANIA.

SCISSORS.

1,198,484.

Specification of Letters Patent.

Patented Sept. 19, 1916.

Application filed July 9, 1915. Serial No. 38,954.

*To all whom it may concern:*

Be it known that I, WILLIAM F. SECHRIST, a citizen of the United States, residing at Lancaster, in the county of Lancaster and State of Pennsylvania, have invented a new and useful Scissors, of which the following is a specification.

This invention relates to scissors or shears and more particularly to that type in which detachable cutting edges are employed.

An object of this invention is to provide a pair of shears having blades of novel form to which detachable supplemental cutting blades are readily attached, and said supplemental blades are adapted to be of such simple and inexpensive construction that they may, upon becoming dull, be discarded and new blades substituted.

Another object of the invention is to provide shears having novel supplemental cutting blades which may be attached to the blades of the shears with the minimum of effort, but which after the attachment, present a maximum of rigidity.

A further object of the invention is to provide shears or scissors of general improved construction, whereby they will be durable and inexpensive, as well as convenient, practical, serviceable and efficient in their use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is an elevation of the improved shears. Fig. 2 is an elevation of the inner side of one of the shear blades, depicting the supplemental blade applied thereto. Fig. 3 is a similar view but showing the supplemental blade detached. Fig. 4 is a fragmental perspective view of one of the shear blades. Fig. 5 is a perspective view of one of the supplemental blades. Fig. 6 is a transverse sectional view taken on the line 6—6 of Fig. 1. Fig. 7 is a transverse sectional view taken on the line 7—7 of Fig. 1. Fig. 8 is an enlarged longitudinal sectional view of the pointed end of the shear blade. Fig. 9 is a transverse sectional view taken on the line 9—9 of Fig. 8.

In carrying out the present invention, there are provided opposed blades 1 of similar construction which have relatively broad pivoting portions 2, and longitudinally extending manipulating handles 3. An oblique shoulder 4 is formed at the juncture of each blade 1 and handle 3.

The blades are reduced along their inner or coöperating edges, as indicated at 5, to define longitudinally extending shoulders or rabbets 6, which extend from the oblique shoulder 4 to the outer terminals of the shear blades 1, where the reduced portion 5 of the blade 1 is extended longitudinally beyond the blade 1 and terminates in a tapered finger or lug 7. A transverse shoulder 8 is formed at the outer terminal of the shear blades 1, or at the base of the tapered lug 7. The edge of the reduced portion 5 is cut away to define an inwardly extending transverse shoulder 9, adjacent the broad pivoting portion 2 of the shear blade 1.

Detachable supplemental cutting blades 10 are adapted to be rigidly secured to the blades 1. Each supplemental blade 10 is provided with a longitudinal cutting edge 11 and an enlarged tapered terminal head 12, which define a transverse shoulder 13. Extending longitudinally from the head 13 and beyond the cutting edge 11, is a reduced portion 14 which has an oblique outer edge 15. By thus reducing the portion 14, a longitudinal shoulder 16 and a transverse shoulder 17 are provided. A longitudinal slot 18 extends inwardly from the oblique edge of the reduced portion 14, and a tapered aperture 19, of substantially the same configuration as the tapered lug 7, extends into the terminal head 12.

The supplemental blades 10 are readily attached to the shear blades 1, by simply placing the shoulder 16 of the supplemental blade into longitudinal engagement with the shoulder 5 of the shear blades and then moving the supplemental blade longitudinally toward the handle end of the shear blades until the slot 18 embraces the shank of a securing screw 20, which is secured to the inner side of the pivoting portion 2 of the shear blade. After the supplemental blade 10 has been moved toward the handle end of the blade 1, sufficient to cause the oblique edge of the supplemental blade to engage the oblique shoulder 4, then the shoulder 17 will engage the shoulder 9, and the shoulder 13 will engage the shoulder 8, while the tapered lug 7 will accurately engage the tapered socket 19. Now the head of the securing screw or element 20 is screwed down tight upon the reduced portion 14 adjacent the slot 18, thus rigidly securing the supplemental blade 10 to the shear blade 1.

Notches or recesses 21 are provided in the inner face of the pivoting portion 2 of the shear blade 1, for the reception of the head of the screw 20 when the shears are in their closed position, while similar notches 22 are formed in the inner face of the pivoting portion 2, to receive the head of the screw 20, when the shears are in their extreme open position. By this arrangement, it is obvious that the presence of the securing screws 20 in no way impedes the successful operation of the improved shears.

It is to be observed that the tapered extensions 7 of the supplemental blades 10 are rectangular in cross section, as clearly shown in Fig. 9, and accurately engage the tapered rectangular in cross section recesses 9, thereby obviating any twisting or lateral movement of the supplemental blades 10 with respect to the shear blade 1.

In practical use, the scissors or shears will, in cutting or shearing the selected material, press the supplemental blades 10 toward the shear blades 1, thereby causing the shear blades 1 to receive the lateral stress which is occasioned by the shearing action. The inward stress of the shearing process is also imparted to the shear blades by the permanent engagement of the shoulders 16 and 6 with the respective inner or adjacent edges of the shear blades 1 and the supplemental blades 10.

Since the supplemental cutting blades 1 are of such inexpensive construction, they may be discarded after becoming dull and new blades substituted in lieu thereof.

Having thus described the invention, what is claimed as new is:

In a device of the character described including pivoted coöperating blades having notches formed therein; tapered lugs extending longitudinally from the free ends of the said blades; lateral shoulders formed at the bases of said lugs; reduced portions extending longitudinally of the pivoted blades; transverse shoulders extending into said reduced portions; supplemental blades having longitudinal slots; enlarged tapered heads extending longitudinally from the supplemental blades and having longitudinally disposed tapered recesses formed therein for the reception of the said tapered lugs; lateral shoulders formed at the bases of the heads and adapted to engage the lateral shoulders formed at the bases of said lugs; reduced portions extending longitudinally of the supplemental blades and adapted to engage the reduced portions of the pivoted blades; transverse shoulders extending from the reduced portions of the supplemental blades and adapted to engage the transverse shoulders which extend into the reduced portions of the pivoted blades; screws adapted to engage the said longitudinal slots to secure the supplemental blades to the pivoted blades, the heads of the screws being received by the said notches to prevent a relatively great movement of the pivoted blades with respect to each other.

In testimony that I claim the foregoing as my own, I have hereto affixed my signature in the presence of two witnesses.

WILLIAM F. SECHRIST.

Witnesses:
JOHN H. MYERS,
HENRY N. FEGLEY.